July 19, 1949.    W. H. WARREN ET AL    2,476,646
MOUNT STRUCTURE FOR ELECTRON DISCHARGE DEVICES
Filed May 17, 1946
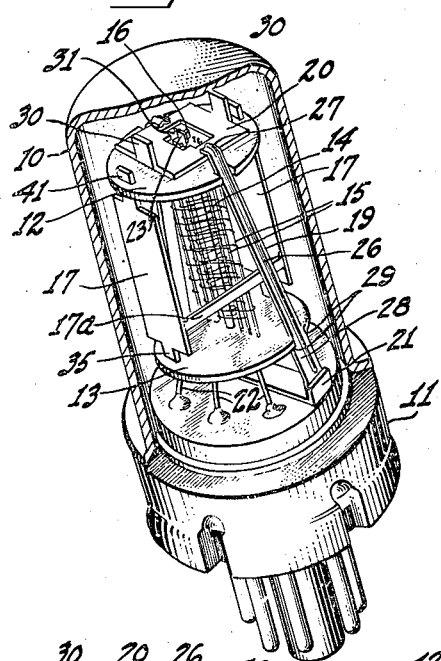
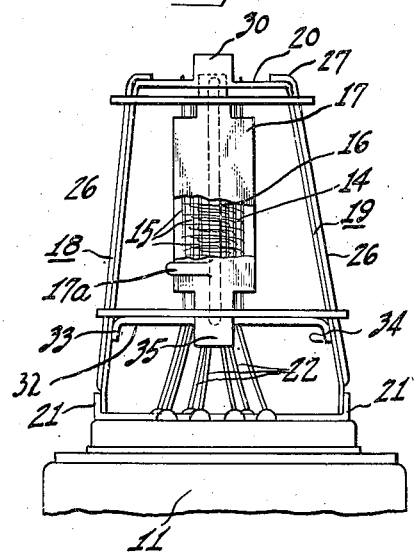
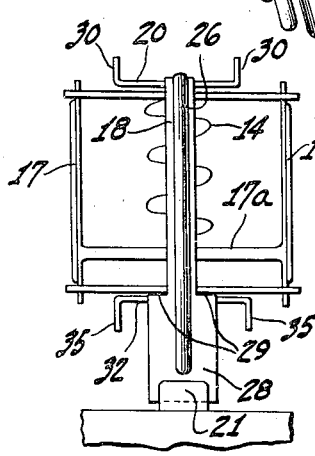
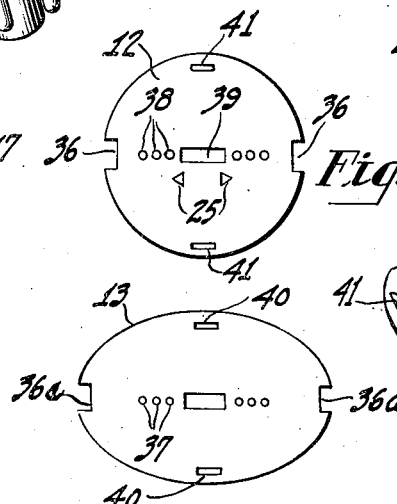
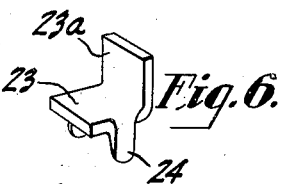
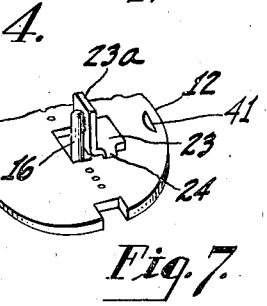
INVENTOR
William H. Warren &
Norval H. Green
BY William A. Zalesak
ATTORNEY Patented July 19, 1949

2,476,646

UNITED STATES PATENT OFFICE 2,476,646

MOUNT STRUCTURE FOR ELECTRON DISCHARGE DEVICES

William H. Warren, West Orange, and Norval H. Green, Hasbrouck Heights, N. J., assignors to Radio Corporation of America, a corporation of Delaware Application May 17, 1946, Serial No. 670,382

14 Claims. (Cl. 250—27.5)

Our invention relates to electron discharge devices and more particularly to the mount structure thereof.

Certain uses to which electron tubes are put involve considerable jarring, severe impact and substantial stresses from forces due to acceleration and deceleration which result in what may be harmful shocks to the tube structure. Thus, long periods of vibration of the tube may set up violent vibrations of the mount within the tube which may be of destructive magnitude. Particularly harmful results produced by such shocks and vibrations are the displacement of the electrode assembly with respect to the tube envelope and shifting of the electrode elements with respect to each other. These conditions are particularly prevalent in railroad and aircraft uses.

It is accordingly the principal object of our invention to provide a mount structure for an electron discharge device which will produce the desired rigidity and mechanical strength for use under conditions involving severe impact, shock, long periods of vibration and substantial forces of acceleration with a minimum impairment of dependability and life of the device.

An additional object of our invention is to prevent shifts in the positioning of internal electrodes in response to severe impact, shock and vibration and thus reduce variations in electrical characteristics.

A further object is to provide means for rigidly supporting the cathode to prevent relative movement between it and the other electrodes of the electrode assembly when the device is subjected to jarring and vibration.

Another object is to provide a mount support which includes the header of a metal envelope tube.

In conventional tube structures the mount assembly which consists of a cathode, a coaxial grid or grids and an anode, is supported against movement with respect to the tube envelope by contact of the edges or fingers of a top mica on the mount assembly against the inside wall of the envelope. This structure is characterized by a lack of rigidity, particularly to forces normal to the axis of the tube, under conditions of severe impact or steady vibration, since the burden of support is carried by the mica contacting the inside envelope wall, and in a relatively short period of time the mica edges will disintegrate. This disintegration releases mica particles in the tube and this produces deleterious effects upon the operation of the tube and in instances of very severe stresses applied along the axis of the tube, the heavy strain produced on the stem-leads may result in a break in the stem-lead-to-electrode welds.

Accordingly an additional object of our invention is to provide a mount structure which is supported solely from the stem or header portion of the tube without impairment of its ability to withstand the application of stresses normal to the tube axis.

Where thin insulating spacers are used to support the electrodes in desired spaced relation, the ends of the grid side rods and fastening ears on the anode are threaded through apertures in said spacers and protrude therethrough to a relatively slight degree. This slight protrusion of the control grid side rods and the anode fastening ears creates undesired capacity effects therebetween which are harmful to the proper operation of the device.

An additional object of our invention, therefore, is to provide suitable shields between said protruding portions of the control grid side rods and the anode fastening ears to prevent the undesirable capacity effects referred to.

In the manufacture of electron discharge devices it is essential that certain spaced relationships exist between the electrode assembly and the inner walls of the envelope. Most difficulty in achieving this desirable spacing is found in properly positioning the electrode assembly on its support, and properly affixing the support to the base or header portion of the tube. If either of these steps is improperly performed, it will contribute to the distortion of the mount of the device, especially where the electrode assembly is supported solely from the header or base of a tube as our invention provides. In this case the problem of properly spacing the mount with respect to the envelope wall is more difficult to solve than in a structure utilizing a mica spacer for engaging the envelope wall to maintain proper spacing between such wall and the electrode assembly. While it is possible in an exclusively base supported electrode assembly to position the electrode assembly properly on its support, and to critically affix the support to the header or base of the tube so that proper spacing exists between the envelope wall and the electrode assembly, these operations usually require considerable skill and substantial time expenditure.

Accordingly, a further object of our invention is to provide means on the electrode assembly, the support therefor, and the stem or header portion of the tube which will facilitate a proper assembly of these elements.

An additional object is to provide cooperating means on the electrode assembly and support therefor which will permit of an interlocking action between these elements of the tube.

It is an additional object to provide cooperating means on the electrode assembly and the support therefor which interlock in only one predetermined position of these elements with respect to each other.

A further object is to provide means for interlocking the electrode assembly with the support therefor, in which the sole position in which the interlocking action occurs is obvious to the operator and therefore requires little skill and time expenditure in assembly.

A still further object of the invention is to provide interlocking means on the electrode assembly and the support therefor which will result in a secure and permanent positioning of these elements with respect to each other which will withstand severe shocks and vibrations to which the device may be subjected.

An additional object of our invention is to provide cooperating means on the electrode assembly support and the stem or header portion of the tube whereby the support member may be easily and accurately affixed to the stem or header of the tube.

Other objects and features of our invention will become apparent as the description continues.

A full understanding of our invention may be had by referring to the accompanying drawing wherein one embodiment of our invention is illustrated and wherein Figure 1 is a perspective view partly in section of an electron discharge device using a mount structure made according to our invention;

Figure 2 is an elevation of our improved mount partly cut away to show details of the electrode arrangement;

Figure 3 is a side elevation of our mount rotated through 90° from the view of Figure 2;

Figure 4 is a top spacer which may be employed in the electrode assembly;

Figure 5 is a bottom spacer which may be used;

Figure 6 is a perspective view of our novel bracket for supporting the cathode; and Figure 7 shows the bracket of Figure 6 mounted on one of the spacers and supporting the cathode.

Referring now to Figures 1, 2 and 3, there is shown an electron discharge device comprising an envelope 10, closed at one end and sealed at the other end by a header 11 which is preferably of the type employed in tubes using metal envelopes.

Within said envelope is mounted an electrode assembly including insulating spacers 12, 13, more clearly shown in Figures 4 and 5, which support the electrodes including grid 14 mounted on grid rods 15, cathode 16 and anode 17, in proper spaced relation. Grid rods 15 and anode 17 are further supported against longitudinal movement with respect to spacers 12, 13 by means which may include grid stops, not shown, and stapled engagement between said anode and spacers through apertures 40, 41. The anode 17 may be formed of two plates as shown in Figures 1 and 3 positioned on opposite sides of the grid assembly in planes parallel to the plane of the grid support rods, and the potential of the two plates may be equalized by a connector 17a shown in Figures 2 and 3. Lead-in wires 22 extending through the header 11 suitably connect to external contact pins the electrodes within the envelope.

According to our invention there is provided a U-shaped strap having legs 18, 19 and a flat closed end or transverse portion 20, on which the electrode assembly is mounted and by which it is supported. The free ends of legs 18, 19 are suitably fastened as by welding to ears 21 projecting from the header 11.

The U-shaped strap referred to is adapted to support the electrode assembly against movement relative to the envelope 10 of the device. It accomplishes this function, first by being itself mechanically rugged and capable of withstanding stresses from any direction, and secondly by being provided with means cooperating with complementary means on the electrode assembly for securing a firm and fixed mounting of the electrode assembly thereon.

The structure of the U-shaped strap is designed to give it great strength to withstand shocks and vibrations of considerable magnitude. This structure includes a corrugation or rib 26 which extends longitudinally of each leg 18, 19 from a point near the free end thereof to a point beyond the bend 27. Furthermore, each of said legs 18, 19 lies substantially in a straight line and both legs diverge in the direction of their free ends. The U-shaped strap is made of an integral flat metal stock whereby it possesses naturally great strength to oppose stresses applied to its edges. The corrugation or rib 26 renders the strap effective to oppose stresses applied normal to its edges. The divergence of the legs 18, 19 and continuance of the corrugations beyond the bend result in cooperative action of both legs in opposing stresses applied to one of the legs. The free ends of the legs 18, 19 of the U-shaped strap are suitably fastened as by welding to the ears 21 projected from the header 11. The corrugation or rib 26 provided on each of the legs 18, 19 extends toward the free end of each of said legs to a point where it meets one of the ears 21. Therefore the portion of each of said legs 18, 19 through which the corrugation or rib does not extend, is given a suitable strength and stiffness by the additional body of said ear. In addition, each of said legs 18, 19 is wider in the vicinity of its free end as shown at 28, thus providing a reinforcement at this end where fastening of the U-shaped strap of the header 11 is effected, and where consequently greater strength is required due to the concentration of stresses at this point. The wider portion 28 of each of said legs 18, 19 in addition provides shoulders 29 which cooperate to support the electrode assembly in a manner to be more fully described below.

An additional structural feature of the U-shaped strap which gives it added strength to oppose angular displacement of legs 18, 19 with respect to the transverse portion 20 is the provision of lugs 30 projecting from said transverse portion 20 in a direction normal to its plane. These lugs add edge opposition to stresses tending to bend such transverse portion 20. This reenforcement is particularly desirable at this location because of the aperture 31 required in said transverse portion 20 to accommodate protruding elements of the electrode assembly, the occasion for which will be more fully described below in connection with the support of the electrode assembly by the U-shaped strap. The lugs 30 also perform a shielding action against electrostatic forces between certain of the electrodes, to be more fully explained as this description proceeds.

In addition, we may provide in a modification of our invention a metallic plate 32 between the legs 18, 19 suitably welded to said legs at turned down opposite edges 33, 34 of said plate to give added rigidity to the mount structure. The plate 32 may be provided with lugs 35 extending normal to its surface to give added strength to said surface against deflection or bending, and also to provide an electrostatic shielding means between certain of the electrodes, to be more fully explained below. It is thus apparent that we have provided a mount structure which is characterized by great ruggedness and mechanical strength.

Cooperative means are provided on said U-shaped strap and on said electrode assembly for securely mounting said electrode assembly on said strap. Such cooperating means on the U-shaped strap comprise the transverse portion 20 thereof, the aperture 31 in said transverse member and shoulders 29 provided on each of the legs 18, 19. The cooperating means on the electrode assembly comprise insulating spacers 12, 13 and peripheral slots 36, 36a therein, more clearly shown in Figures 4 and 5. One of said insulating spacers 12 is placed in surface abutment with respect to said transverse portion 20 of the U-shaped strap to hold said electrode assembly against longitudinal movement in one direction. To permit this abutment relation between said spacer and transverse portion 20, the latter is provided with an aperture 31, previously referred to, to accommodate protruding ends of the cathode 16 and grid rods 15. Another of said spacers 13 rests on the shoulders 29 and is held against longitudinal movement in a direction opposite to the first-mentioned direction. The peripheral slots 36 in spacers 12, 13 receive a portion of the legs 18, 19 and serve to hold the electrode assembly against lateral or rotational movement with respect to said U-shaped strap. Since said slot-and-leg engagement and said spacer-and-shoulder engagement occur in only one predetermined position of said electrode assembly with respect to said U-shaped supporting strap, it is assured that once such engagement takes place, a proper mounted relationship exists between the electrode assembly and the U-shaped strap, and no critical adjustment is therefore required in the mounting of the electrode assembly upon said U-shaped strap. Furthermore, the engagement between these elements is positive and includes no part thereof which is free to respond to forces tending to release the engagement.

Not only does our invention provide a rugged electrode assembly, a mechanically strong U-shaped support for the electrode assembly, and a readily effected firm and properly spaced engagement between said electrode assembly and the U-shaped support strap, but it also includes means to properly support the U-shaped strap on the header 11 of the device. It is essential that the U-shaped strap be so supported on the header 11 that the electrode assembly will observe desired space requirements with respect to the header 11 and the wall of the envelope 10. This result is obtained by a predetermined length relationship of the legs 18, 19 to the internal dimensions of the device and the positioning of the ears 21 at predetermined points on the header 11. Furthermore, the spacing of the ears 21 at opposite sides of the header 11 at a portion thereof enclosed by envelope 10 results in a span between the support points of the U-shaped strap to said ears which is of desirable width to minimize the effect of improper mounting of the U-shaped strap on said header. For example, a vertical displacement to a slight degree of the free end of one leg 18 with respect to ear 21 will affect the position of the electrode assembly with respect to the envelope 10 to a lesser degree than would be the case if the span between ears 21 were of less width.

It will be noted in Figures 1, 4 and 5 that a portion of the anode 17 is threaded through apertures 40, 41 in said spacers 12, 13 for a stapled connection therewith. A portion of said anode therefore extends through said spacers. Also it will be noted that grid side rods 15 extend through apertures 37, 38 of said spacers. Harmful electrostatic effects may result between the protruding portions of the anode 17 and the grid rods 15, particularly the grid rods supporting the control grid. According to our invention, the lugs 30, 35 effectively shield the anode from the grids to prevent such undesirable electrostatic effects. Lugs 30, 35 therefore perform the dual function of electrostatic shielding as well as contributing to the ruggedness and mechanical strength of the transverse portions 20 and 32 of which they are respectively an integral part. Such strengthening is particularly desirable in connection with the transverse portion 20 which, as will be noted, is apertured at 31 to accommodate protruding ends of the grid support rods and the cathode.

Our invention also includes a novel bracket 23 shown in Figures 6 and 7, having ears 24 extending through apertures 25 in insulating spacer 12 and bent against the underside of this spacer to fix the bracket thereon. Bracket 23 has an angularly disposed portion 23a which is welded or otherwise fixedly secured to an end portion of the cathode 16 protruding through aperture 39 of spacer 12. This results in a mechanically strong and rugged support of the cathode 16 by the spacer 12.

Our invention has been illustrated and is preferably employed in connection with a metallic envelope tube. Thus the header 11 is better capable of withstanding stresses due to impact, shock, vibration and acceleration than the glass stem usually associated with glass envelope tubes. The glass stem referred to is usually sealed to the tube envelope and the envelope is mounted on the base of the tube. Stresses applied to the glass stem as the result of supporting thereon the mount structure, thus pass to the seal and may rupture the same. The header 11 is itself the base of the tube and stresses from the electrode mount are transferred directly to it without traversing the seal.

However, certain other advantages of our invention will accompany the use thereof in glass envelope tubes. Accordingly we do not wish to limit our invention to metal envelope tubes. Furthermore the invention may be employed with equal advantage in a tube having any number of conventional electrodes including diodes. It is obvious, therefore, that many modifications may be made in our invention without departing from its spirit and we desire to include all such modifications within the scope of the appended claims.

What we claim as new is:

1. An electron discharge device having an envelope closed at one end by a header, a mount assembly mounted on said header and including an electrode assembly and support therefor, said support comprising a U-shaped strap of flat metal stock having legs each of which extend in a substantially straight line throughout its length and cooperating means on said electrode assembly and on said U-shaped strap fixing said electrode assembly on said U-shaped strap, said means on said strap comprising a widened portion thereof providing a shoulder for engaging said means on said shoulder.

2. An electron discharge device having an electrode assembly provided at each end thereof with an insulating spacer plate, a U-shaped strap support having diverging legs, each of said legs extending along a substantially straight line, said spacer plates having peripheral slots receiving said legs, and means fixing said assembly between said legs against the closed end of said U-shaped strap, said means including a widened portion of said legs engaging one of said spacer plates.

3. An electron discharge device having an electrode assembly provided at each end thereof with an insulating spacer plate, a U-shaped strap support having diverging legs, each of which extends along a substantially straight line, said spaced plates having peripheral slots receiving said legs, said legs having shoulders at their free ends supporting one of said spacer plates and holding the other of said spacer plates against the closed end of said U-shaped member, said shoulders comprising a widened portion of said legs adjacent their ends.

4. An electron discharge device having an electrode assembly provided at each end thereof with an insulating spacer plate, a U-shaped strap support of sheet metal stock having diverging legs, each extending in a substantially straight line, each leg having a longitudinal corrugation, each of said spacer plates having peripheral slots receiving said legs, and means fixing said assembly between said legs against the closed end of said U-shaped strap, said means including shoulders formed by widened portions of said legs and engaging one of said spacer plates.

5. An electron discharge device having an electrode assembly, an insulating spacer member mounted at each end therof, a support for said assembly comprising a U-shaped strap having a flat closed end portion and legs extending in substantially straight lines, one of said insulating members abutting said closed end portion, means including shoulders on said U-shaped strap engaging the other insulating member to fix said assembly within said support, said shoulders comprising widened portions of said legs adjacent their ends, said insulating members having peripheral slots receiving the legs of said strap, and an envelope closed at one end by a header, the ends of the legs of said strap being secured to said header.

6. An electron discharge device having an electrode assembly provided with two parallel spaced insulating spacer members, a U-shaped strap support having a flat closed end portion and legs extending in substantially straight lines, means supporting said assembly between the legs of said strap, said means including shoulders formed by widened portions of said legs engaging one of said spacer members against movement in one direction and abutment engagement of said other spacer member with said flat closed end portion against movement in the opposite direction, and an envelope closed at one end by a header, the ends of the legs of said strap being secured to said header.

7. An electron discharge device having an electrode assembly provided with two parallel spaced insulating spacer members, a U-shaped strap support having a flat closed end portion and legs extending in substantially straight lines, means supporting said assembly between the legs of said strap, said means including a transverse metal plate in axially spaced parallel relation to said flat closed end portion of said strap, and an envelope closed at one end by a header, the ends of the legs of said strap being secured to said header.

8. An electron discharge device having an electrode assembly including axially spaced insulating spacers, a U-shaped strap support for said electrode assembly having a flat closed end portion and legs extending from said closed end portion in substantially straight lines, a stiffened longitudinal corrugation on each of said legs, a portion of each of said legs being wider than the remainder thereof, each of said wider portions forming shoulders facing said flat closed end portion, one of said insulating spacers abutting the inner surface of said flat closed end portion of said strap and the other insulating spacer resting on said shoulders whereby said spacers are held against axial displacement.

9. An electron discharge device having an envelope closed by a header, an electrode assembly within said envelope, and a support for said electrode assembly, said electrode assembly including two axially spaced insulating spacer plates provided with peripheral slots, said support comprising a U-shaped metallic strap closed at one end by a flat transverse portion and having substantially straight legs, said legs having shoulders facing said transverse portion, said shoulders being formed by widened portions of said legs, one of said spacer plates being held against the inner face of said transverse portion and the other of said spacer plates being held against said shoulders, said peripheral slots receiving portions of said strap, whereby said spacer plates are held against movement with respect to said strap, the free ends of said strap being secured to said header.

10. An electron discharge device having an envelope closed at one end by a header, an electrode assembly within said envelope, a U-shaped strap support of sheet metal stock for said electrode assembly having a flat closed end portion, and combined stiffening and electrostatic shielding means on said flat closed end portion, the ends of the legs of said strap being secured to said header.

11. An electron discharge device having an envelope closed at one end by a header, an electrode assembly within said envelope, a U-shaped strap support of sheet metal stock for said electrode assembly having a flat closed end portion, said flat closed end portion having an aperture therein, cooperating electrodes in said electrode assembly having end portions thereof extending through said aperture, integral portions of said flat closed end portion extending normal to the plane thereof, said integral portions lying in planes parallel to the plane of the legs of said U-shaped strap, whereby said flat closed end is stiffened against stresses in the plane of said legs, the free ends of the legs of said strap being secured to said header.

12. An electron discharge device having an envelope closed at one end by a header, an electrode assembly within said envelope, a U-shaped strap support of sheet metal stock for said electrode assembly having a flat closed end portion, cooperating electrodes in said electrode assembly having portions thereof extending through the plane of said flat closed end portion, and integral portions of said flat closed end portion extending perpendicularly from said flat closed end portion, said integral portions being positioned between said portions of certain of said electrodes and constituting electrostatic shields therefor, the free ends of said strap being secured to said header.

13. An electron discharge device having an envelope closed at one end by a header, an electrode assembly including cooperating electrodes within said envelope, a U-shaped strap support of sheet metal for said electrode assembly having a flat closed end portion defining one limit of said electrode assembly, a metallic plate supported between the legs of said U-shaped metallic strap in axially spaced relation to said flat closed end portion and defining another limit of said electrode assembly, certain of said electrodes extending into the planes of said flat closed end portion and said metallic plate, and integral portions of said flat closed end portion and of said metallic plate extending between portions of certain of said electrodes as electrostatic shields, the free ends of the legs of said strap being secured to said header.

14. An electron discharge device having an envelope closed at one end by a header, an electrode assembly within said envelope and a support for said electrode assembly, said support being secured to said header, said electrode assembly including axially spaced insulating plates for supporting electrodes therein, said electrodes including an indirectly heated cathode comprising an electron emitting sleeve, portions of said sleeve extending through the planes of said insulating plates, and an L-shaped clip having one portion stapled to one of said plates, and another portion fixed to one end of said sleeve adjacent one end thereof.

WILLIAM H. WARREN.
NORVAL H. GREEN.

REFERENCES CITED

The following references are of record in the file of this patent:

UNITED STATES PATENTS

| Number | Name | Date |
| --- | --- | --- |
| 1,748,026 | Mitchell | Feb. 18, 1930 |
| 1,870,943 | Blakeman | Aug. 9, 1932 |
| 2,225,445 | Green | Dec. 17, 1940 |
| 2,248,937 | Green | July 15, 1941 |
| 2,324,367 | Dailey | July 13, 1943 |